May 6, 1958 M. RAGOCZY 2,834,009
CONTROL DEVICE FOR AUTOMOBILE LIGHTS
Filed May 12, 1954
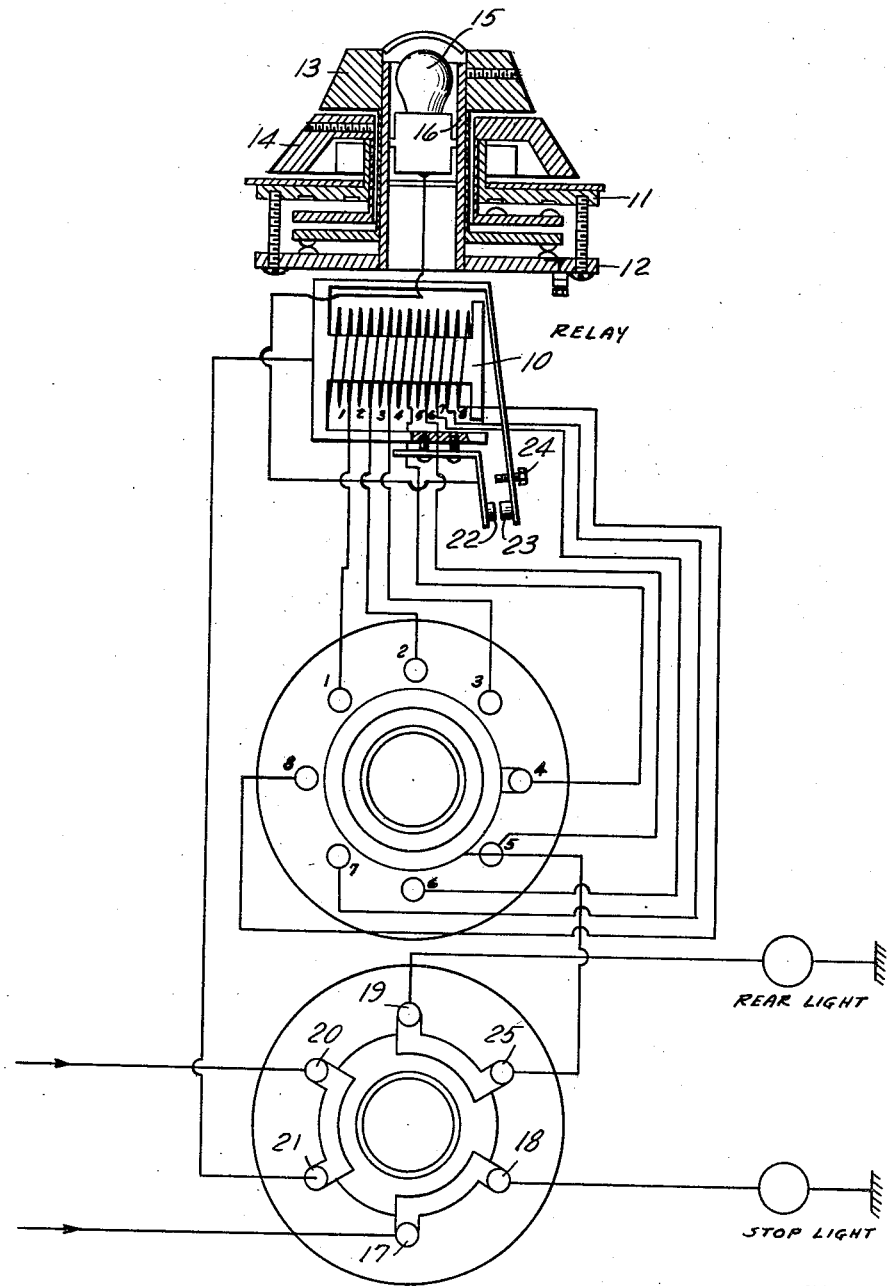
INVENTOR
MARTIN RAGOCZY
BY
/ATTORNEY

United States Patent Office 2,834,009
Patented May 6, 1958

2,834,009
CONTROL DEVICE FOR AUTOMOBILE LIGHTS
Martin Ragoczy, Darmstadt, Germany
Application May 12, 1954, Serial No. 429,335
4 Claims. (Cl. 340—251)

This invention relates to relays for controlling the rear lights of automobiles from the driver's seat. It is well recognized that many accidents result from failure of rear and stop lights and many control devices including some with relays have been proposed for controlling rear lights and brake actuated stop lights. Such prior devices however were effective only for single load conditions and the object of the present invention is to provide a device which is adjustable for all possible loads and which can be inserted selectively in the circuit of rear lights or stop lights of installations at present in use. Further objects will be apparent from the following description when considered in connection with the accompanying drawing in which the single figure is a diagrammatic view of the control device.

The control lamp is located in the instrument switch arranged on the instrument panel of an automobile and in the field of vision of the driver. The device has two main parts, the relay 10 and a switch set comprising a step switch 11 and a change-over switch 12, the arms of which switches are operated by knobs 13 and 14 on concentric hollow shafts. The control lamp 15 is located in the hollow shaft 16. The relay comprises an electromagnet having one end of its winding grounded to the relay body, which winding has a number of taps corresponding to the number of switching conditions desired. Each tap has a contact and the contacts are arranged in a circle on a plate of insulating material. A contact spring actuable by the outer hollow shaft 16 and the knob 14 provides connection between an annular contact and the tap coming from the relay. This contact ring is mounted on the same plate and is connected to the contact 5 of the change-over switch. The change-over switch as shown, has an insulating base with contacts 1–6 thereon, and switch arms actuated by the knob 13 and the inner hollow shaft 16.

A terminal 17 is joined by a conductor to the ignition lock, from 18 a conductor leads to the brake stop light, from 58a the return conductor from the light switch, and from 19 the conductor leading to the rear lights. On setting the device to control the rear lights current flows from the terminal 20 over the switch arm to the contact 21, to the relay body, through the relay winding to the active tap and one of the contacts of the step switch, through the contact spring and the contact ring to the contact 5 of the change-over switch 12, over the contact spring to the terminal 19 and thence to the rear lights. The circuit for the stop light goes from the ignition lock to the terminal 17 over the contact spring to terminal 18 and from there to the stop light. On turning the change-over switch 12 the switch springs are exchanged and the current path for the rear lights goes directly over 17 and switch spring to 18 and thence to the stop light. From contact 21 to contact 25 of the change-over switch the current flows through the active turns of the electromagnet.

The control lamp is connected in parallel with the circuit to be controlled and is held in circuit by the energized magnet at contacts 22 and 23. If the step switch is adjusted for fewer watts than the current consumption in the controlled circuit, then the magnet is more strongly energized and the point of an adjusting screw 24 will force the contacts apart and the control lamp will light up only briefly. Below the rotary knobs there is provided a scale disc marked with the number of watts. This disc is marked in accordance with the taps and the step switch. By exchange of discs the same device may be used for 6 and 12 volt equipment since a load of 5 watts at 6 volts corresponds to a load of 10 watts at 12 volts. The term "load" herein employed is thus equivalent to "current" strength or force.

The foregoing description refers to contacts 17 to 21, and the current path is defined by the parts 20, 19, 17, 18, which parts are terminal screws to which are fixed contacts.

Normally the change-over switch is rotated to stop light position and the step switch is set for the watt consumption of the stop lights. When all the lamps are in order, actuation of the brakes will cause the control lamp to glow. This position is retained by the change-over switch and the step switch while the car is running. If the rear lights, as in night travel, are to be tested, the change-over switch is rotated to rear light position and the step switch is set to the wattage of all the rear lights. If only one lamp is defective the control lamp will not glow. By operating the switch, it can be ascertained at once whether the control lamp itself is defective, and it can be exchanged without any special tool.

The device enables all rear and stop lights of motor vehicles and trailers to be controlled and tested from the driver's seat while the car is running and in motion.

The purpose of the device is, to determine from the driver's seat whether, and how many of the rear- and stop-lights are functioning, at all times. In the description it is mentioned that it is possible to control other current consuming devices with this invention, that means, with a different shaped switch-plate of the change-over switch, three circuits can be tested selectively. The control device is only connected in series to the rear- and stop-lights. One circuit will always be under control, according to the corresponding setting of the change-over switch, while the other circuit can be considered untouched by the device.

In the attached drawing, are the settings to control, for instance, 20 watts for rear-lights in setting No. I, and the setting No. II shows the device controlling 20 watts for stop-lights.

I claim as my invention:

1. Control device for testing lamps and other current consuming devices in automobiles especially rear and stop lights in multiple circuits, comprising a relay having a plurality of taps, a control lamp arranged to be placed in circuit by said relay, a plurality of lamps, means for selectively connecting said relay in series circuit with said lamps to determine at will if the lamps are functioning, and a pair of knobs and hollow shafts concentrically mounted and connected to operate said means, said means including a step switch controlled by one of the knobs and hollow shafts connecting the taps to the lamps through a change-over switch controlled by the other knob and hollow shaft.

2. Control device according to claim 1, in which said means includes the step switch and the change-over switch combined as a unit.

3. Control device according to claim 1, in which the relay armature has an adjusting screw capable on overload of allowing only transient closure of the relay contacts.

4. Control device according to claim 1, in which said control lamp is provided in a hollow shaft of the said means.

References Cited in the file of this patent
UNITED STATES PATENTS

| 2,039,516 | Black | May 5, 1936 |
| 2,100,695 | Lackey | Nov. 30, 1937 |
| 2,172,903 | Charping | Sept. 12, 1939 |
| 2,223,201 | Beeb et al. | Nov. 26, 1940 |